United States Patent
Paneah et al.

(10) Patent No.: US 11,218,397 B2
(45) Date of Patent: Jan. 4, 2022

(54) DUAL PURPOSE NIC/PCIE PROTOCOL LOGIC ANALYZER

(71) Applicant: Mellanox Technologies, Ltd., Yokneam (IL)

(72) Inventors: Peter Paneah, Nesher (IL); Yoni Galezer, Haifa (IL); Vladimir Vainer, Kiryat Shmona (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 483 days.

(21) Appl. No.: 16/258,600

(22) Filed: Jan. 27, 2019

(65) Prior Publication Data
US 2020/0244562 A1 Jul. 30, 2020

(51) Int. Cl.
*G06F 13/42* (2006.01)
*H04L 12/26* (2006.01)
*G06F 11/30* (2006.01)
*G06F 11/36* (2006.01)
*G06F 13/40* (2006.01)

(52) U.S. Cl.
CPC .......... *H04L 43/18* (2013.01); *G06F 11/3027* (2013.01); *G06F 11/364* (2013.01); *G06F 13/4022* (2013.01); *G06F 13/4282* (2013.01); *G06F 2201/87* (2013.01); *G06F 2213/0026* (2013.01)

(58) Field of Classification Search
CPC ...................................... H04L 43/18
USPC ........................................ 710/105
See application file for complete search history.

(56) References Cited

U.S. PATENT DOCUMENTS

| | | | | | |
|---|---|---|---|---|---|
| 5,398,236 | A | * | 3/1995 | Hemmady | H04L 1/22 370/218 |
| 5,850,388 | A | * | 12/1998 | Anderson | H04L 43/00 370/252 |
| 6,671,828 | B1 | * | 12/2003 | Tursich | H04L 43/00 709/224 |
| 6,931,574 | B1 | * | 8/2005 | Coupal | H04L 43/18 709/230 |
| 2003/0229827 | A1 | * | 12/2003 | Dun | G06F 11/221 714/48 |

(Continued)

OTHER PUBLICATIONS

Chen et al., "PCI Express-based Ethernet 25 Switch", M.Sc. Thesis, Arizona State University, pp. 1-109, May 2012.

(Continued)

*Primary Examiner* — Henry Tsai
*Assistant Examiner* — Dean Phan
(74) *Attorney, Agent, or Firm* — Kligler & Associates Patent Attorneys Ltd

(57) ABSTRACT

An apparatus includes a processor, a first interface configured to connect to a bus of the apparatus, a second interface configured to communicate over a packet network, and circuitry. The circuitry is configured to, in a first operational mode, exchange data between the processor and one or more remote devices over the packet network, via the second interface, and in a second operational mode, monitor the bus using the first interface, detect a predefined trigger event occurring on the bus and, in response to detecting the trigger event, log one or more transactions on the bus that are adjacent to the trigger event and generate one or more protocol-analysis packets comprising at least part of the logged transactions.

16 Claims, 3 Drawing Sheets

(56) References Cited

U.S. PATENT DOCUMENTS

2018/0052793 A1* 2/2018 Fang .................. H04L 41/0806
2019/0044840 A1* 2/2019 Agrawal ............... H04L 43/045

OTHER PUBLICATIONS

Tektronix, "Tektronix PCI Express Logic Protocol Analyzer", TLA7SA00 Series Data Sheet, pp. 1-12, Jun. 9, 2017.
Tektronix, "Tektronix PCI Express Logic Protocol Analyzer", TLA7SA00 Series Data Sheet, pp. 1-8, Sep. 22, 2011.

* cited by examiner

DUAL PURPOSE NIC/PCIE PROTOCOL LOGIC ANALYZER

FIELD OF THE INVENTION

The present invention relates generally to computer networks and protocol analysis, and particularly to dual-purpose network interfaces/PCIe protocol analyzers.

BACKGROUND OF THE INVENTION

Peripheral Component Interconnect Express (PCIe) is a bus that is widely used in computer equipment. When a hardware system comprising a PCIe bus is debugged, it may be necessary to track PCIe bus transactions, and analyze the transactions' protocol.

PCIe protocol logic analyzers (PLA) are instruments that analyze PCIe bus transactions. PCIe PLAs are available from a plurality of vendors. One example is Tektronix PCI Express Logic Protocol Analyzer, which is described in a data sheet entitled "TLA7SA00 Series Datasheet," Sep. 22, 2011.

A Network Interface Controller (NIC), also known as a Network Interface Card, network adapter, LAN adapter or physical network interface, is a computer hardware component that connects a computer to a computer network. NICs are available from a plurality of sources.

A description of both Ethernet and PCIe basic concepts are described by Chen, in "PCI Express-based Ethernet Switch," M. Sc. Thesis, Arizona State University, May 2012.

SUMMARY OF THE INVENTION

An embodiment of the present invention that is described herein provides an apparatus including a processor, a first interface configured to connect to a bus of the apparatus, a second interface configured to communicate over a packet network, and circuitry. The circuitry is configured to, in a first operational mode, exchange data between the processor and one or more remote devices over the packet network, via the second interface, and in a second operational mode, monitor the bus using the first interface, detect a predefined trigger event occurring on the bus and, in response to detecting the trigger event, log one or more transactions on the bus that are adjacent to the trigger event and generate one or more protocol-analysis packets including at least part of the logged transactions.

In some embodiments, the apparatus further includes an interposer connected to first and second bus devices, the first interface includes first and second ports, an RX input of the first port is connected via the interposer to a TX output of the first bus device, a TX output of the first port is connected via the interposer to an RX input of the second bus device, an RX input of the second port is connected via the interposer to a TX output of the second bus device, and a TX output of the second port is connected via the interposer to an RX input of the first bus device. In some embodiments the first interface includes a first loopback connection that connects the RX input and the TX output of the first port, and a second loopback connection that connects the RX input and the TX output of the second port.

In a disclosed embodiment, the apparatus further includes a serial bus, and the circuitry is configured to send the protocol-analysis packets over the serial bus. In an alternative embodiment, the circuitry is configured to send the protocol-analysis packets over the packet network via the second interface.

In some embodiments, the bus includes a Peripheral Component Interconnect Express (PCIe) bus. In an embodiment, the circuitry is configured to encapsulate the logged transactions in Transaction Layer Packets (TLP). In an embodiment, the first interface includes a loopback connection.

There is additionally provided, in accordance with an embodiment of the present invention, a method in a device that includes a processor, a first interface configured to connect to a bus of the device, and a second interface configured to communicate over a packet network. The method includes, in a first operational mode, exchanging data between the processor and one or more remote devices over the packet network, via the second interface, and in a second operational mode, monitoring the bus using the first interface, detecting a predefined trigger event occurring on the bus and, in response to detecting the trigger event, logging one or more transactions on the bus that are adjacent to the trigger event and generating one or more protocol-analysis packets including at least part of the logged transactions.

The present invention will be more fully understood from the following detailed description of the embodiments thereof, taken together with the drawings in which:

DETAILED DESCRIPTION OF EMBODIMENTS

Overview

Figure 1:
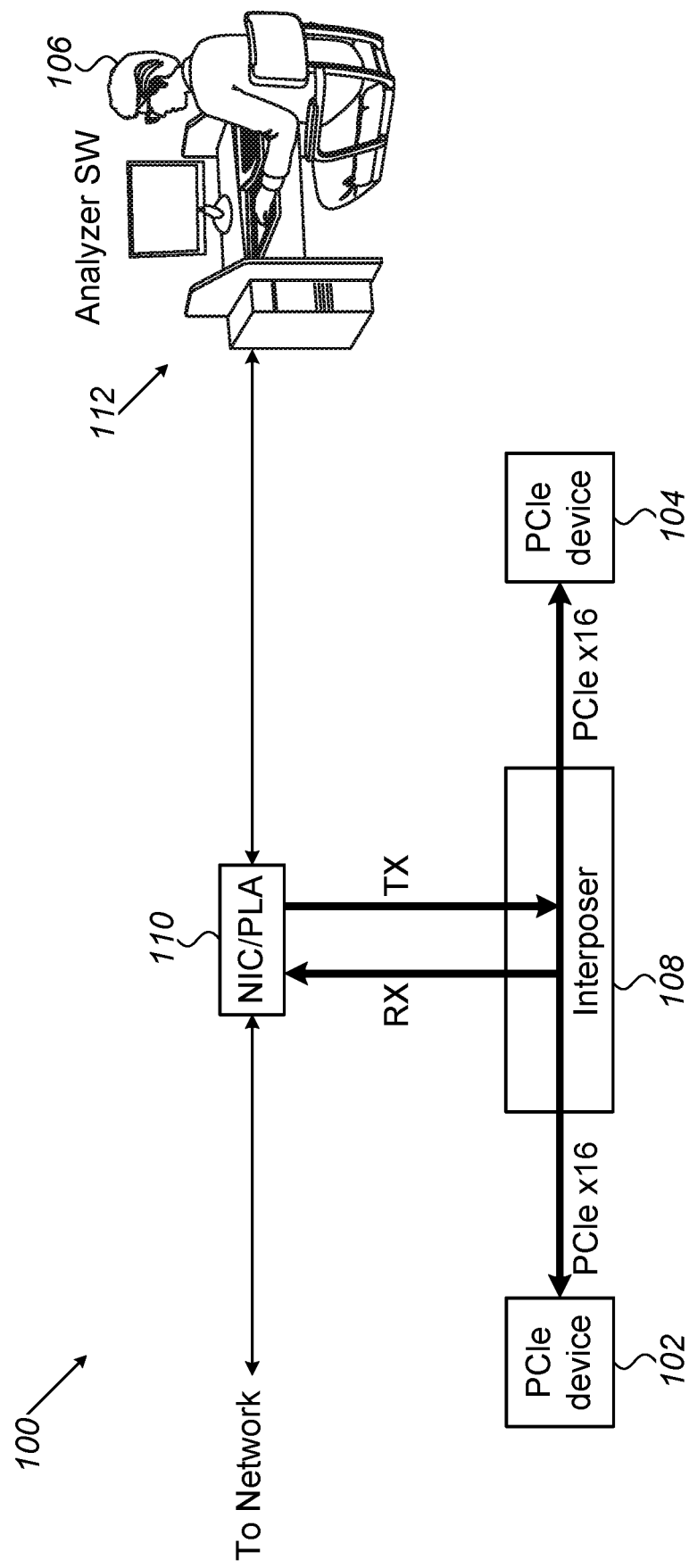
FIG. 1 is a block diagram that schematically illustrates PCIe protocol analysis using a combined NIC/PLA, in accordance with an embodiment of the present invention.

Computer systems often comprise a plurality of physically separated logic units (e.g., printed-circuit boards), and a high-speed bus that connects the logic units. According to embodiments of the present invention that will be described herein, the high-speed bus is Peripheral Component Interconnect Express (PCIe). Other high-speed buses may be used in alternative embodiments.

When a computer system comprising a high-speed bus is debugged, it may be necessary to analyze transactions on the PCIe bus. For example, a user may want to trigger data logging when PCIe driver x writes a packet y to PCIe destination z. Such debugging will be referred to hereinbelow as PCIe Protocol Analysis.

According to embodiments of the present invention, PCIe protocol analysis is carried out by PCIe Protocol Logic Analyzers (PCIe PLA; or PLA). A PCIe PLA is a device that captures, parses and analyzes PCIe traffic, typically comprising hardware and software. The PLA hardware is typically connected to the PCIe channels by an interposer, which mirrors the PCIe traffic with minimal intervention in the electrical characteristics of the channels (in some embodiments, the PLA hardware uses repeaters, to regain any losses on the PCIe channels that the hardware may induce). The PLA parses the signal, extracts the PCIe traffic patterns, and stores the patterns in memory.

Logging of the PCIe traffic, and the subsequent presentation of the logged data, can be initiated by a trigger. The trigger is typically a hardware event (for example, PCIe driver x writing a packet y to PCIe destination z). The PLA software, typically operated by a human user, configures one or more triggers, and sends the triggers to the PLA.

According to embodiments of the present invention, the PLA hardware further comprises trigger and data logging logic, to trigger data logging upon the occurrence of user-defined events (a trigger or a chain of triggers), and log the PCIe bus traffic.

The PLA software is configured to provide a user interface, including system configuration, definition of triggers, monitoring options, display preferences including data filtering, and others.

Embodiments of the present invention provide a Network Interface Controller (NIC) that also serves as a protocol analyzer. According to embodiments, a NIC is a device that comprises a Network Adaptor, an ARM processor, DDR4 memory and one or more X16 gen4 PCIe interfaces. In alternative embodiments, the NIC may comprise other processor or processors, and other types of RAM or other memory.

According to embodiments of the present invention, the disclosed dual-purpose NIC and PCIe PLA share some major logic units. A NIC typically comprises a network adapter, a processor (or processors), RAM, PCIe interface and PCIe ports; whereas a PCIe PLA may comprise a processor (or processors), RAM, PCIe interface and PCIe ports. Embodiments of the present invention thus provide a dual purpose NIC/PLA apparatus that comprises the common logic units of a NIC and a PLA, the logic units that are unique to the NIC, and the logic units that are unique to the PLA.

According to some embodiments, the NIC/PLA forks data that the NIC/PLA receives from the TX lanes of the PCIe bus, to the RX lanes of the PCIe bus, and, to a PCIe Interface. The PCIe Interface parses the PCIe data and encapsulates the parsed data into packets with a predefined format. The NIC/PLA next stores the packets in a cyclic buffer within its main storage (e.g. DRAM). The PLA Software configures a trigger and sends it to the NIC/PLA. The NIC/PLA detects the occurrence of the trigger on the PCIe data. The NIC/PLA may suspend storing of PCIe packets in the cyclic buffer when the trigger occurs, or after the NIC/PLA fills an additional preset buffer size. Thus, when the NIC/PLA stops the PCIe data logging, data in the cyclic buffer will comprise pre-trigger data, a trigger and post-trigger data. The NIC/PLA notifies the PLA software that data logging has stopped. The PLA software may then, using a Graphic User Interface (GUI), display the data to the user in a user-preferred format, and, optionally, store the data locally.

Alternative embodiments of the present invention provide protocol analysis of buses other than PCIe—for example, VMEbus and RapidIO.

Thus, a low-cost solution to PCIe protocol analysis is achieved, using hardware which also functions as a NIC. In addition, in embodiments of the present invention, PCIe Protocol Analysis can be done from a remote location, through the network.

System Description

FIG. 1 is a block diagram that schematically illustrates PCIe protocol analysis 100, using a combined NIC/PLA, in accordance with an embodiment of the present invention.

The Device Under Test (DUT) comprises a first PCIe device 102 and a second PCIe device 104, that are coupled to each other with a fast bus. In the example embodiment of FIG. 1, the fast bus is PCIe 16X (16 channels). In alternative embodiments, the bus may be other variants of PCIe, or a non-PCIE bus.

A User 106 analyzes the communication protocol between PCIe devices 102 and 104. The user plugs an Interposer 108, into the PCIe bus.

According to embodiments of the present invention, interposer 108 is a PC board that is coupled by Rx and Tx buses to a Combined NIC/PLA 110 (will be referred to hereinbelow as NIC/PLA). According to embodiments of the present invention, the impact of the interposer on the PCIe bus is low, allowing real-time PCIe protocol analysis.

NIC/PLA 110 is configured to receive trigger setting and other control instructions from an PLA Software 112, to detect trigger events in the PCIe protocol, to log the PCIe transactions data in memory, and to send the logged data to Analyzer Software 112.

The PLA software may reside in the same physical enclosure of NIC/PLA 110, or in a different enclosure. It comprises a user interface software, that allows User 106 to specify simple and complex triggers, and displays the logged transactions to the user, using a Graphic User Interface (GUI).

In embodiments according to the present invention, the NIC/PLA is also configured to receive and transmit packets from and to a network; e.g. InfiniBand or Ethernet.

In other words, NIC/PLA 110 supports two operational modes. In one operational mode, NIC/PLA 110 is configured to serve as a NIC. In this example, a processor (e.g., CPU) that is coupled to NIC/PLA 110 through a PCIe bus, sends and receives packets over the network, through the NIC/PLA and through the PCIe bus. In a second operational mode, NIC/PLA 110 is configured to perform PCIe protocol analysis. The PCIe interface, and possibly other elements, is reused in both operational modes.

Thus, according to the example embodiment of FIG. 1, Protocol Logic Analysis of a PCIe bus is possible using a combined NIC/PCIe PLA. As the NIC/PLA can be connected to a network, PLA can be done from a remote location (not shown in FIG. 1).

As would be appreciated, the configuration of PCIe protocol analysis 100 is an example configuration that is depicted purely for the sake of conceptual clarity. Other suitable configurations may be used in alternative embodiments of the present invention. For example, User 106 may be remote, and communicate with PLA Software 112 through the network; More PCIe devices can be monitored, by the same interposer 108 or by a plurality of interposers; PLA Software 112 may be embedded in NIC/PLA 110, in a remote server on the network, or distributed between several processors; and, buses other than PCIe may be used.

In some embodiments, NIC/PLA 110 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Figure 2:
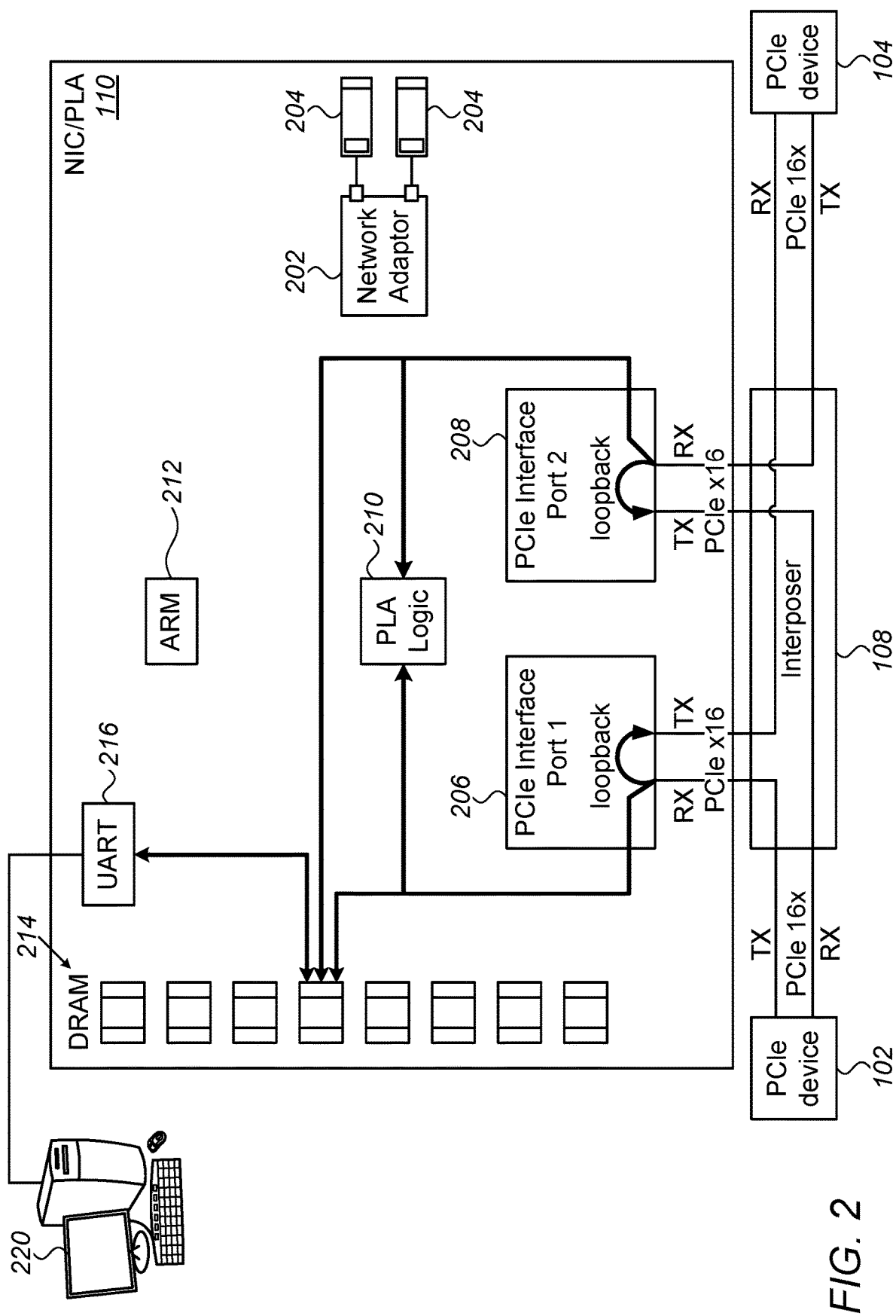
FIG. 2 is a block diagram that schematically illustrates the hardware of a combined NIC/PLA, in accordance with an embodiment of the present invention.

FIG. 2 is a block diagram that schematically illustrates the hardware of NIC/PLA 110 (FIG. 1), in accordance with an embodiment of the present invention.

NIC/PLA 110 comprises a Network Adaptor 202, coupled through Network Connectors 204 to a network (e.g. Infini- Band); two PCIe interface ports 1 (206) and 2 (208); a PLA Logic 210, an ARM processor 212 (which may be an aggregation of multiple ARM processors); and, a DRAM 214. The NIC/PLA is coupled through an Interposer 108 to a PCIe bus, which is connected to PCIe device 102 and PCIe device 104.

NIC/PLA 110 further comprises a UART 216 that is coupled to an External Computer 220, configured to execute the PLA software. Interposer 108 is coupled to the PCIe ports of PCIe devices 102 and 104; and, through PCIe interfaces 206 and 208, to NIC/PLA 110. The interposer 108 is configured to route PCIe Tx data from PCIe device 102 to PCIe interface 206 Rx input, and PCIe Tx data from PCIe device 104 to PCIe interface 208 Rx input. The Interposer 108 is further configured to route PCIe Tx data from PCIe Interface 206 to the Rx port of PCIe device 104, and PCIe Tx data from PCIe Interface 208 to the Rx port of PCIe device 102. As will be described hereinbelow, each PCIe interface unit 206 and 208 loops-back data received in its associated PCIe Rx port to its associated PCIe Tx port. Thus, data that PCIe device 102 sends on the PCIe Tx port arrives, through the interposer and through PCIe Interface 206, at the Rx port of PCIe device 104. Similarly, Tx data from PCIe device 104 arrives, through the interposer and through PCIe interface 208, at the Rx port of PCIe device 102.

According to the example embodiment of FIG. 2, PCIe interface ports 206 and 208 comprise loopback circuits. The loopback circuits drive the Tx lanes with data that the loop-back circuits received on the Rx lanes, with minimum delay. In other words, the data path from PCIe device 102's Tx port to PCIe device 104's Rx port is cut at the interposer, and PCIe device 104 gets its Rx data from a loopback circuit in PCIe Interface Port 206. Additionally, PCIe device 102 Tx data is routed to PLA Logic 210, and to DRAM 214, and PCIe device 104 Tx data is routed to PLA Logic 210, and to DRAM 214.

PLA Logic 210 is configured to get the triggers and trigger logic from the user, via a GUI that runs on Remote Computer 220; detect trigger occurrences on the data the PLA Logic receives from PCIe devices 102, 104; and, control the logging (i.e. storing) of PCIe transactions data in DRAM 214, respective to the detection of trigger events.

ARM 212 is configured to send stored data from DRAM 214, through UART 216, to Remote Computer 220, which displays the stored data (or part thereof) on the screen and/or stores the data (or part thereof) in local store. ARM 212 is further configured to govern the network interface operation. In some embodiments ARM 212 reads data from DRAM 214 and transfers the data to UART 216; in alternative embodiments, the ARM configures a Direct Memory Access unit (DMA; not shown) to transfer the data from the DRAM to the UART.

Thus, according to the example embodiment of FIG. 2, the user can run protocol logic analysis of a bus such as PCIe, using a combined NIC/PLA.

The configurations of NIC/PLA 110, shown in FIG. 2, is an example configuration that is shown purely for the sake of conceptual clarity. Any other suitable configurations can be used in alternative embodiments. For example, NIC/PLA 110 may comprise multiple network adapters, an SRAM rather than DRAM 214; and, an Inter-Integrated Circuit (I2C) interface rather than UART 216. Remote Computer 220 may be embedded in ARM 212, or, may be coupled to the NIC/PLA through the network. ARM 212 may be an aggregation of a plurality of ARM processors, or any other suitable processor or processors.

Figure 3:
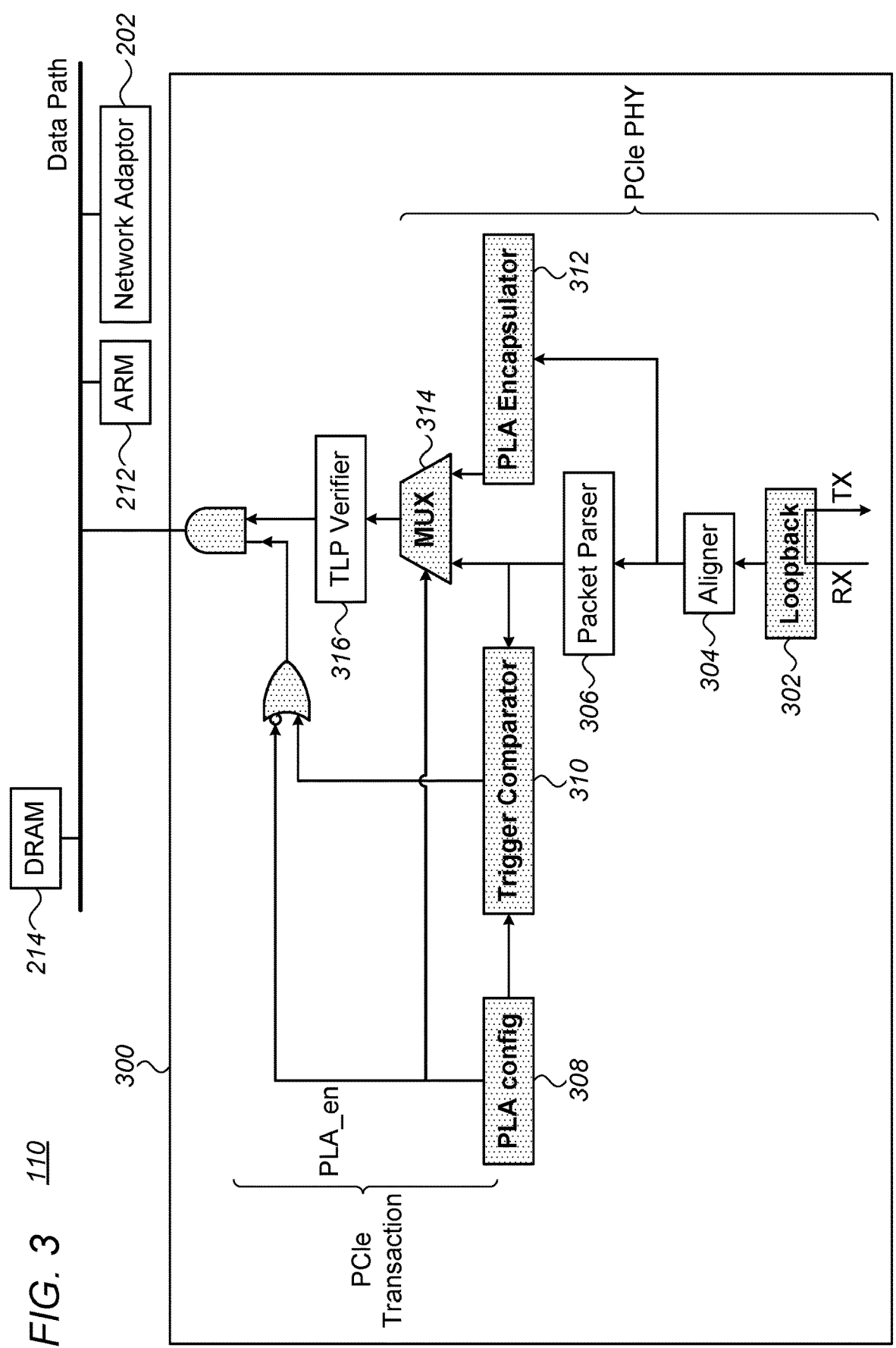
FIG. 3 is a block diagram that schematically illustrates the hardware of combined NIC/PLA, providing details of the PCIe interface, in accordance with an embodiment of the present invention.

FIG. 3 is a block diagram that schematically illustrates the hardware of combined NIC/PLA 110 (FIG. 1), providing details of a PCIe interface 300, in accordance with an embodiment of the present invention.

The NIC/PLA comprises (see FIG. 2) ARM 212, Network Adapter 202, and, a PCIe Interface 300.

PCIe Interface 300 comprises a loopback unit 302 (comprising two loopback circuits, one for each of PCIe Interface Ports 206 and 208, of FIG. 2); an Aligner 304, a Packet Parser 306, a PLA Configuration 308, a Trigger Comparator 310, a PLA Encapsulator 312, a Mux 314, and, a TLP Verifier 316. The grey-filled units in FIG. 2—Loopback 302, PLA Configuration 308, Trigger Comparator 310, PLA Encapsulator 312, MUX 314, as well as logic which enables the connection of the PCIe interface to the NIC/PLA data bus, are logic units which are only active when the NIC/PLA is configured as a PLA. The other units of the PCIe interface—Aligner 304, Packet Parser 306 and TLP Verifier 316 are active in both NIC and PLA configurations.

A PLA-enable configuration bit (will be described below) enables the grey-filled units when PLA is enabled, and, bypasses the grey-filled units when PLA is disabled.

Loopback 302 is configured to receive data from the PCIe Tx lanes, and fork or duplicate the data into two paths. A first path routes the received data through a loop-back circuit, back to the PCIe Rx lanes (if PLA-enable is on), and a second path routes the received data to an Aligner 304. If PLA-enable configuration bit is off (i.e.—PLA is disabled), the loopback unit is bypassed, and data is routed directly from the PCIe Tx lanes to the Aligner.

Aligner 304 is configured to detect symbols and blocks of data, align the data to symbol (or block) boundary and pass the data to a Packet Parser 306. Packet Parser 306 is configured to implement the PCIe PHY layer protocol part, including determining the packets' delimiters and verifying the correctness of the arriving patterns. PLA Encapsulator 312 receives aligned data (in symbols or blocks) from the Aligner, adds meta-data, and formats the packets so that the PLA software would be able to extract the required information easily. The Encapsulator then adds Transaction Layer Packet (TLP) header. A unique header is used, configured so that a TLP Verifier 316 will recognize the packet as a PLA-encapsulated packet.

A Multiplexor 314 is configured to transfer to the TLP Verifier encapsulated PLA packets from PLA Encapsulator 312 if PLA-enable is on; or packets that are parsed by Packet Parser 306 if PLA-Enable is off. In some embodiments, if PLA-enable is on, MUX 314 may transfer both parsed packets from packet parser 306, and, encapsulated PLA packets from PLA Encapsulator 312, allowing concurrent NIC and PLA operation, and, hence, Protocol Analysis by a remote user.

TLP Verifier 316 is configured to implement PCIe Transaction Layer checks and routing. When the TLP Verifier receives a packet with a TLP header, the TLP verifier forces all check results to TRUE, and forwards the packet to DRAM 214.

A PLA Configuration unit 308 is configured to receive configuration information from the user (via ARM 212), and to store the configuration, including the PLA Enable bit, and the trigger(s) definition.

According to embodiments of the present invention, the NIC/PLA continuously monitors transactions on the PCIe bus, to detect the occurrence of trigger conditions. A trigger condition can be, for example, a PCIe memory read cycle, from an offset 0x14 of the PCIe BA, or, the completion of a PCIe cycle with Unsupported Request (UR) status. A Trigger Comparator 310 is configured to receive the trigger definition from PLA Configuration 308, to receive the packets from packet parser 306, and, to check for the occurrence of a trigger.

The output of PCIe Interface 300 is configured to drive the internal bus of the NIC/PLA if TLP Verifier 316 verifies that the packet is good, and, if either a trigger condition is true, or PLA mode is not enabled. The user can configure the trigger, along with a post and pre-trigger buffer sizes. The NIC/PLA may continue to log the PCIe packets after it detects trigger occurrence, until it fills the configured post-trigger buffer size. Thus, when the NIC/PLA stops the data logging, the cyclic buffer will comprise pre-trigger data, the trigger, and post trigger data.

Thus, according to the example embodiment of FIG. 3, PCIe packets are routed back through the interposer to their destination; protocol logic analysis is enabled by comparing packets to trigger condition, and, adding headers to packets that fulfill the trigger so that they will be directed to the DRAM. If PLA-enable is off, the PLA-Logic functions as a PCIe interface. According to some embodiments, the PLA logic can function in both modes at the same time. A NIC/PLA apparatus according to the example embodiment of FIG. 3, comprises a NIC only apparatus, with a small number of additional units.

In the foregoing, we will collectively refer to all the elements of the NIC/PLA other than the ports and the interfaces as "circuitry." "Circuitry" may comprise, according to an embodiment of the present invention, PLA Logic 210, PLA CONFIG 308, Trigger Comparator 310, PLA Encapsulator 312 and TLP Verifier, (FIGS. 2 and 3). In alternative embodiments, the circuitry may have any other suitable configuration.

As would be appreciated, the configurations of PLA Logic 210, shown in FIG. 3, is an example configuration that is shown purely for the sake of conceptual clarity. Any other suitable configurations can be used in alternative embodiments. For example, for buses other than PCIe, some of the units may change; for another example, the PLA Logic may comprise a micro controller.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   a first interface, configured to connect to a peripheral bus, and to communicate over the peripheral bus at least with a computer system;
   a second interface, configured to communicate over a packet network; and
   circuitry, configured to:
   in a first operational mode, serve as a Network Interface Controller (NIC) for the computer system, by exchanging data between the computer system and one or more remote devices over the packet network, via the second interface; and
   in a second operational mode, serve as a Protocol Logic Analyzer (PLA) for the computer system by monitoring the peripheral bus using the first interface, detecting a predefined trigger event occurring on the peripheral bus and, in response to detecting the trigger event, logging one or more transactions on the peripheral bus that are adjacent to the trigger event and generating one or more protocol-analysis packets comprising at least part of the logged transactions,
   wherein the circuitry comprises one or more common logic units, which are used both when the circuitry serves as a NIC and when the circuitry serves as a PLA.

2. The apparatus according to claim 1, further comprising an interposer connected to first and second bus devices, wherein the first interface comprises first and second ports, and wherein:
   an RX input of the first port is connected via the interposer to a TX output of the first bus device;
   a TX output of the first port is connected via the interposer to an RX input of the second bus device;
   an RX input of the second port is connected via the interposer to a TX output of the second bus device; and
   a TX output of the second port is connected via the interposer to an RX input of the first bus device.

3. The apparatus according to claim 2, wherein the first interface comprises a first loopback connection that connects the RX input and the TX output of the first port, and a second loopback connection that connects the RX input and the TX output of the second port.

4. The apparatus according to claim 1, wherein the apparatus further comprises a serial bus, and wherein the circuitry is configured to send the protocol-analysis packets over the serial bus.

5. The apparatus according to claim 1, wherein the circuitry is configured to send the protocol-analysis packets over the packet network via the second interface.

6. The apparatus according to claim 1, wherein the peripheral bus comprises a Peripheral Component Interconnect Express (PCIe) bus.

7. The apparatus according to claim 1, wherein the circuitry is configured to encapsulate the logged transactions in Transaction Layer Packets (TLP).

8. The apparatus according to claim 1, wherein the first interface comprises a loopback connection.

9. A method in a device that comprises a first interface configured to connect to a peripheral bus and to communicate over the peripheral bus at least with a computer system, and a second interface configured to communicate over a packet network, the method comprising:
   in a first operational mode, operating the device as a Network Interface Controller (NIC) for the computer system, by exchanging data between the computer system and one or more remote devices over the packet network, via the second interface; and
   in a second operational mode, operating the device as a Protocol Logic Analyzer (PLA) for the computer system, by monitoring the peripheral bus using the first interface, detecting a predefined trigger event occurring on the peripheral bus and, in response to detecting the trigger event, logging one or more transactions on the peripheral bus that are adjacent to the trigger event and generating one or more protocol-analysis packets comprising at least part of the logged transactions, including operating one or more common logic units, which are used both when operating the device as a NIC and when operating the device as a PLA.

10. The method according to claim 9, wherein the first interface comprises first and second ports, and wherein:
- an RX input of the first port is connected, via an interposer connected to first and second bus devices, to a TX output of the first bus device;
- a TX output of the first port is connected via the interposer to an RX input of the second bus device;
- an RX input of the second port is connected via the interposer to a TX output of the second bus device; and
- a TX output of the second port is connected via the interposer to an RX input of the first bus device.

11. The method according to claim 10, wherein the first interface comprises a first loopback connection that connects the RX input and the TX output of the first port, and a second loopback connection that connects the RX input and the TX output of the second port.

12. The method according to claim 9, and comprising sending the protocol-analysis packets over a serial bus.

13. The method according to claim 9, and comprising sending the protocol-analysis packets over the packet network via the second interface.

14. The apparatus according to claim 9, wherein the peripheral bus comprises a Peripheral Component Interconnect Express (PCIe) bus.

15. The method according to claim 9, and comprising encapsulating the logged transactions in Transaction Layer Packets (TLP).

16. The method according to claim 9, wherein the first interface comprises a loopback connection.

* * * * *